(12) United States Patent
Oksman et al.

(10) Patent No.: US 10,476,995 B2
(45) Date of Patent: Nov. 12, 2019

(54) PHYSICAL MEDIUM DEPENDENT LAYER BONDING

(71) Applicant: Lantiq Beteiligungs-GmbH & Co. KG, Neubiberg (DE)

(72) Inventors: Vladimir Oksman, Morganville, NJ (US); Dietmar Schoppmeier, Unterhaching (DE)

(73) Assignee: Lantiq Beteiligungs—GmbH & Co. KG, Neubiberg (DE)

( * ) Notice: Subject to any disclaimer, the term of this patent is extended or adjusted under 35 U.S.C. 154(b) by 85 days.

(21) Appl. No.: 15/522,809

(22) PCT Filed: Nov. 18, 2015

(86) PCT No.: PCT/EP2015/076970
§ 371 (c)(1),
(2) Date: Apr. 28, 2017

(87) PCT Pub. No.: WO2016/079182
PCT Pub. Date: May 26, 2016

(65) Prior Publication Data
US 2017/0318133 A1 Nov. 2, 2017

Related U.S. Application Data

(60) Provisional application No. 62/081,637, filed on Nov. 19, 2014.

(51) Int. Cl.
*H04L 29/08* (2006.01)
*H04L 29/06* (2006.01)
(Continued)

(52) U.S. Cl.
CPC .......... *H04L 69/323* (2013.01); *H04J 3/0658* (2013.01); *H04L 12/12* (2013.01);
(Continued)

(58) Field of Classification Search
CPC ....................................................... H04L 69/23
See application file for complete search history.

(56) References Cited

U.S. PATENT DOCUMENTS 4,930,119 A * 5/1990 Kobayashi ............ H04L 12/437
340/2.28
6,359,881 B1 * 3/2002 Gerszberg ............ H04Q 3/0016
370/354

(Continued)

OTHER PUBLICATIONS

"Series G: Transmission Systems and Media, Digital Systems and Networks, Digital sections and digital line system—Access networks." ITU-T Recommendation G.998.2. Telecommunication Standardization Section of ITU-T, International Telecommunication Union, (Jan. 2005), 18 pages.

(Continued)

*Primary Examiner* — Parth Patel
(74) *Attorney, Agent, or Firm* — Eschweiler & Potashnik, LLC

(57) ABSTRACT

A first protocol stack for communication on a first physical line is implemented. At least parts of a second protocol stack for communication on a second physical line are implemented. The first protocol stack and the second protocol stack are bonded at the Physical Medium Dependent layer of the first protocol stack and the Physical Medium Dependent layer of the second protocol stack (172). In some scenarios, the bonding may be at an upper edge of the Physical Medium Dependent layer, i.e., at the δ interface.

19 Claims, 11 Drawing Sheets

(51) Int. Cl.
*H04J 3/06* (2006.01)
*H04L 12/12* (2006.01)

(52) U.S. Cl.
CPC ............. *H04L 69/14* (2013.01); *H04L 69/18* (2013.01); *Y02D 50/30* (2018.01)

(56) References Cited

U.S. PATENT DOCUMENTS

| | | | | |
|---|---|---|---|---|
| 7,519,021 | B1* | 4/2009 | Johnson | H04L 12/4616 370/315 |
| 8,988,987 | B2* | 3/2015 | Bakhshi | H04L 69/18 370/221 |
| 9,276,874 | B1* | 3/2016 | Mok | H04L 7/042 |
| 9,438,744 | B2* | 9/2016 | Klocke | H04M 11/06 |
| 9,531,646 | B1* | 12/2016 | Vijayaraghavan | H04L 49/90 |
| 2004/0076166 | A1* | 4/2004 | Patenaude | H04J 3/1611 370/401 |
| 2004/0240881 | A1* | 12/2004 | Dotaro | H04J 14/0227 398/19 |
| 2005/0180429 | A1* | 8/2005 | Ghahremani | H04L 41/0654 370/395.21 |
| 2006/0062170 | A1* | 3/2006 | Boutaud De La Combe | H04L 12/6402 370/321 |
| 2006/0104315 | A1* | 5/2006 | Volkening | H04L 12/2856 370/535 |
| 2006/0109816 | A1* | 5/2006 | Imaeda | H04L 47/10 370/329 |
| 2006/0126505 | A1* | 6/2006 | Denney | H04J 3/1694 370/229 |
| 2006/0182139 | A1* | 8/2006 | Bugajski | H04L 29/06027 370/464 |
| 2006/0215689 | A1* | 9/2006 | Liu | H04Q 3/64 370/465 |
| 2007/0110434 | A1* | 5/2007 | Sato | H04J 14/022 398/19 |
| 2007/0110436 | A1* | 5/2007 | Bennett | H04L 67/14 398/37 |
| 2007/0184798 | A1* | 8/2007 | Bitran | H04B 7/026 455/132 |
| 2007/0195817 | A1* | 8/2007 | Denney | H04J 3/1682 370/468 |
| 2007/0280126 | A1* | 12/2007 | Liu | H04M 11/062 370/252 |
| 2008/0170531 | A1* | 7/2008 | Petry | H04L 65/601 370/312 |
| 2008/0227441 | A1* | 9/2008 | Hermel | H04W 88/10 455/422.1 |
| 2008/0259932 | A1* | 10/2008 | Gabriel | H04L 67/14 370/395.5 |
| 2009/0016244 | A1* | 1/2009 | Sharma | H04L 45/02 370/307 |
| 2009/0325610 | A1* | 12/2009 | Liu | H04W 4/24 455/466 |
| 2010/0061235 | A1* | 3/2010 | Pai | H04L 12/2801 370/230.1 |
| 2010/0226390 | A1* | 9/2010 | Yan | H04L 12/2801 370/468 |
| 2010/0268971 | A1* | 10/2010 | Poo | H04W 52/0261 713/320 |
| 2011/0019381 | A1* | 1/2011 | Kawano | H04B 3/54 361/783 |
| 2012/0044918 | A1* | 2/2012 | Ardhanari | H04L 47/2441 370/338 |
| 2012/0134262 | A1* | 5/2012 | Licardie | H04L 12/40182 370/225 |
| 2012/0213259 | A1* | 8/2012 | Renken | H04N 7/17309 375/222 |
| 2014/0226661 | A1* | 8/2014 | Mekkattuparamban | H04L 45/74 370/392 |
| 2014/0355446 | A1* | 12/2014 | Altman | H04W 28/0289 370/235 |
| 2015/0103663 | A1* | 4/2015 | Amini | H04W 28/0215 370/235 |
| 2015/0135209 | A1* | 5/2015 | LaBosco | H04N 21/43635 725/31 |
| 2015/0172112 | A1* | 6/2015 | Itkin | H04L 45/245 370/216 |
| 2015/0200855 | A1* | 7/2015 | Overcash | H04L 47/12 370/235 |
| 2015/0245309 | A1* | 8/2015 | Nayak | H04W 60/005 455/435.3 |
| 2016/0269192 | A1* | 9/2016 | Evans | H04L 65/605 |
| 2016/0366283 | A1* | 12/2016 | Cooke | H04L 12/437 |
| 2017/0134263 | A1* | 5/2017 | Zhang | H04L 1/22 |

OTHER PUBLICATIONS

Tanenbaum, A.S. "Computer Networks, Reference Models." Jan. 1, 1996, Computer Networks, Prentice-Hall International, London, GB. XP000863865. 12 pages.

International Search Report for PCT/EP2015/076970, dated Jul. 3, 2016.

* cited by examiner

PHYSICAL MEDIUM DEPENDENT LAYER BONDING

This application claims the benefit of International Patent Application No. PCT/EP2015/076970 filed on Nov. 18, 2015, which claims priority to U.S. Provisional Application No. 62/081,637 filed on Nov. 19, 2014, the contents of which are herein incorporated by reference in their entirety.

TECHNICAL FIELD

Various embodiments relate to a method of bonding physical lines at a modem and to a corresponding device. In particular, various embodiments relate to techniques of bonding a first protocol stack and a second protocol stack at the Physical Medium Dependent layer.

BACKGROUND

According to International Telecommunications Union (ITU) Telecommunications standard (ITU-T) G.998.2 (2005) bonding of a plurality of physical lines is located in between the physical layer (layer 1) and the data link layer (layer 2) at the γ interface.

Bonding above the physical layer or at an upper edge of the physical layer has certain restrictions and drawbacks. E.g., it can be required to provide differential delay compensation buffers to cope with the required differential delay of up to 10 milliseconds for high bit rates. In particular, big differential delay compensation buffers may be required in a scenario where 10 ms impulse noise impacts one of the bonded physical lines, but not other bonded physical lines.

A further drawback is that adding another physical line to a bonding group can be comparably slow. Thus, switching between bonded mode and unbonded mode may not be possible or only possible to a limited degree during Showtime.

Further limitations and drawbacks relate to operation of the various physical lines in different modes. E.g., within existing reference implementations of bonding, operation may be limited to either full power transmission for all bonded physical lines or low power mode for all bonded physical lines. A combination of full power mode for one more bonded physical lines on the one hand side, with low power mode for further bonded physical lines on the other hand side may not be possible or only possible to a limited degree.

A further drawback of existing reference implementations of bonding relates to additional bonding overhead introduced. The bonding overhead reduces the throughput of applications implemented on the physical lines of a bonded group. E.g., fragmentation using sequence numbers identifying fragments may be used for distributing data between bonded physical lines; sequence numbers may require additional overhead.

SUMMARY

Therefore, a need exists for advanced techniques of bonding. In particular, a need exists for techniques which overcome or mitigate at least some of the above-identified drawbacks and restrictions.

This need is met by the features of the independent claims. The dependent claims define embodiments.

According to various embodiments, a method of bonding physical lines at a modem is provided. The method comprises implementing a first protocol stack for communication on a first physical line and implementing at least parts of a second protocol stack for communication on a second physical line. The method further comprises bonding the first protocol stack and the second protocol stack at the Physical Medium Dependent layer of the first protocol stack and at the Physical Medium Dependent layer of the second protocol stack.

According to various embodiments, a device is provided. The device comprises a first interface configured to communicate on a first physical line. The device further comprises a second interface configured to communicate on a second physical line. The device further comprises at least one processor configured to implement a first protocol stack for communication on the first physical line via the interface. The at least one processor is further configured to implement at least parts of a second protocol stack for communication on the second physical line via the second interface. The at least one processor is configured to bond the first protocol stack and the second protocol stack at the Physical Medium Dependent layer of the first protocol stack and at the Physical Medium Dependent layer of the second protocol stack.

According to various embodiments, a computer program product is provided. The computer program product comprises program code that can be executed by at least one processor. Executing the program code by the at least one processor causes the at least one processor to execute a method. The method comprises implementing a first protocol stack for communication on a first physical line and implementing at least parts of a second protocol stack for communication on a second physical line. The method further comprises bonding the first protocol stack and the second protocol stack at the Physical Medium Dependent layer of the first protocol stack and at the Physical Medium Dependent layer of the second protocol stack.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

In the following, various embodiments are explained in further detail with respect to the accompanying drawings.

FIG. 3 schematically illustrates at greater detail the physical layer of first and second protocol stacks implemented for communication on the first and second physical lines, respectively, wherein FIG. 3 illustrates a first mode where said bonding of the first and second protocol stacks is not executed according to various embodiments.

FIG. 4 generally corresponds to FIG. 3, wherein FIG. 4 illustrates a second mode where said bonding is executed according to various embodiments.

DETAILED DESCRIPTION OF EMBODIMENTS

Figure 1:
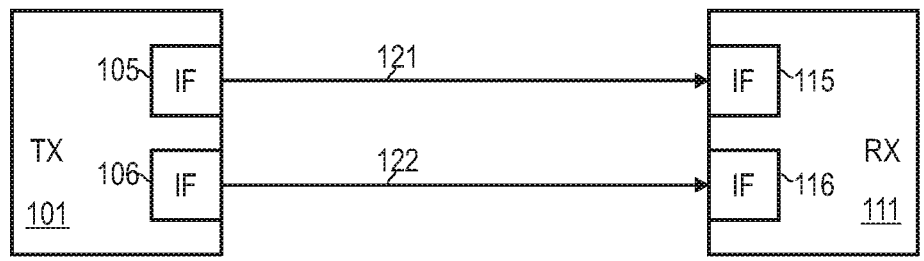
FIG. 1 is a schematic illustration of two modems connected via a first physical line and a second physical line.

In the following, embodiments will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, various techniques of bonding multiple physical lines are disclosed. E.g., by bonding the multiple physical lines, Ethernet transport may be distributed across the multiple physical lines, thereby facilitating high traffic throughput of communication between a transmitter modem and a receiver modem. Sometimes, bonding is also referred to as aggregating multiple physical lines.

Techniques disclosed herein may be applied to various kinds of transmission protocols. A particular focus is put, hereinafter, on transmission according to the ITU-T G.9701 G.fast protocol for illustrative purposes only. Respective techniques may be readily applied to other kinds of communication protocols, including, but not limited to ITU-T G.992.X (ADSL and ADSL 2+), G.993.1 (VDSL1), and G.993.2 (VDSL2). Respective techniques may also be applied to non-DSL communication protocols; examples include the Institute of Electrical and Electronics Engineers (IEEE) 802.11 Wireless Local Area Network (WLAN) communication protocol and the Third Generation Partnership Project (3GPP) Long-Term Evolution (LTE) or Universal Mobile Telecommunications system (UMTS) protocol. Further examples include Bluetooth and satellite communication.

E.g., the various techniques disclosed herein can be applicable for communication system employed for the Internet of Things (IoT) where a large number of devices communicates. Here, high traffic throughput, low energy consumption, and flexibility in operation modes may be of benefit.

According to embodiments, bonding of first and second protocol stacks is implemented at the Physical Medium Dependent (PMD) layer of the first and second protocol stacks. In some examples, bonding is done at the δ interface which corresponds to an upper edge of the PMD layer of the first and second protocol stacks.

Bonding at the upper edge of the PMD layer has particular advantages for time-synchronized physical lines as are typically present for G.fast. In such a scenario, symbol boundaries—e.g., discrete multitone (DMT) symbol boundaries—in different physical lines are aligned in time domain and, furthermore, time positions of synchronization symbols in different physical lines are also aligned. Such a time-domain synchronization is particularly present in vectored communication protocols such as ITU-T G.9701, G.993.2/G.998.4, as well as G.993.5.

A respective scenario is illustrated schematically by FIG. 1. FIG. 1 illustrates a transmitter 101 and a receiver 111. The transmitter 101 implements a first interface 105 configured to communicate via a first physical line 121. The transmitter 101 further implements a second interface 106 configured to communicate via the second physical line 122. The receiver 111 implements a first interface 115 configured to communicate via the first physical line 121. The receiver 111 further implements a second interface 116 configured to communicate via the second physical line 122.

While, with respect to FIG. 1, a scenario is illustrated where the communication on the first and second physical lines 121, 122 is implemented as uni-directional communication, in other scenarios bi-directional communication may be readily employed. E.g., in some scenarios, bi-directional communication in, both, upstream (US) and downstream (DS) may be implemented in frequency division duplexing (FDD) and/or time division duplexing (TDD) modes.

It is possible that the first physical line 121 is a first copper wire pair and that the second physical line is a second copper wire pair. E.g., the first and second physical lines 121, 122 may be integrated into a single cable having a so-called quad-structure. Typically, for a cable having the quad-structure, a comparably strong crosstalk between the pairs of wires implementing the first and second physical lines 121, 122 may be present; at the same time, a strongly reduced crosstalk may be present between different cables having quad-structure. A shielding effect to the outside of the cable may be achieved. Employing both wire pairs of a cable for a single subscriber in a coordinated fashion can substantially improve the traffic throughput of the overall communication system; here, bonding may facilitate such a coordinated combination of communication.

Figure 2:
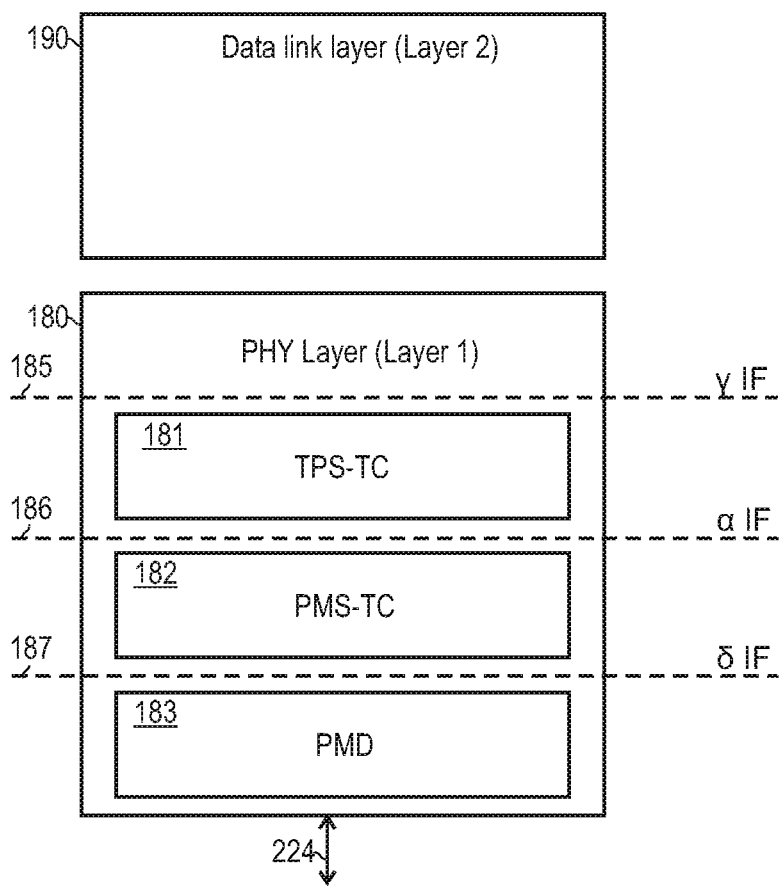
FIG. 2 is a schematic illustration of a physical layer and a data link layer of a protocol stack for communication on one of the physical lines according to FIG. 1, wherein the physical layer implements a Physical Medium Dependent layer according to various embodiments.

Turning to FIG. 2, details of the protocol stacks implemented for a communication on the first and second physical lines 121, 122 are illustrated. FIG. 2 schematically illustrates a protocol stack that may be used in order to operate according to the G.fast protocol. In other examples, other protocols may be employed. The protocol stack 170 of FIG. 2 comprises a data link layer 190 and the physical layer 180. The protocol stack 170 may comprise further upper layers above the data link layer 190 (not shown in FIG. 2 for simplicity). In particular, the protocol stack 170 may be structured according to the Open Systems Interconnection model (OSI model). E.g., the protocol stack 170 may further comprise (in ascending order) a network layer, a transport layer, a session layer, a presentation layer, and an application layer (all not shown in FIG. 2).

The data link layer 190 may implement various functionalities such as: protection of communication of data, e.g., by means of an Automatic Repeat Request (ARQ) protocol; conversion between service data units and protocol data units of, e.g., Ethernet or TCP/IP; multiplexing of multiple protocols atop the data link layer; etc. It is possible that the data link layer 190 comprises one or more (sub-)layers such as the logical link control sublayer and the media access control sublayer (not shown in FIG. 2).

FIG. 2 further illustrates details of aspects of the physical layer 180. The physical layer 180 comprises three (sub-) layers 181-183. The lowest layer is the PMD layer 183. The PMD layer controls communication of individual bits on the physical lines 121, 122. E.g., the PMD layer 183 may access an analog front end (AFE) and generate transmission frames comprising a plurality of symbols by requesting corresponding data from the upper layers 181, 182. As such, it is possible that the sequence of bits 224 output by the PMD layer 183 is modulated into a multitone symbol transmitted on one of the physical lines 121, 122. Further functionality implemented by the PMD layer 183 may comprise elements selected from the group comprising: modulation; signal coding; bit synchronization; Forward Error Correction (FEC); bit interleaving or other channel coding; control of a bit rate, thereby influencing a traffic throughput; etc. It should be understood that in specific technical fields the lowest layer of the protocol stack 170 may be labelled differently than PMD.

The PMD layer 183 is delimited by the delta ($\delta$) interface 187 from the Physical Medium-specific Transmission Convergence layer (PMS-TC) 182. The $\delta$ interface 187, thus, is the upper edge of the PMD. E.g., the PMS-TC layer 182 may implement encapsulation functionality.

The PMS-TC layer 182 is delimited by the $\alpha$ interface 186 from the Transport Protocol-specific Transmission Convergence (TPS-TC) layer 181 interfacing to the data link layer 190 via the $\gamma$ interface 185. E.g., the TPS-TC layer 181 may provide functionality selected from the group comprising: cell conversion; header error check (HEC) calculation; removing idle cell; descrambling of payload.

Figure 3:
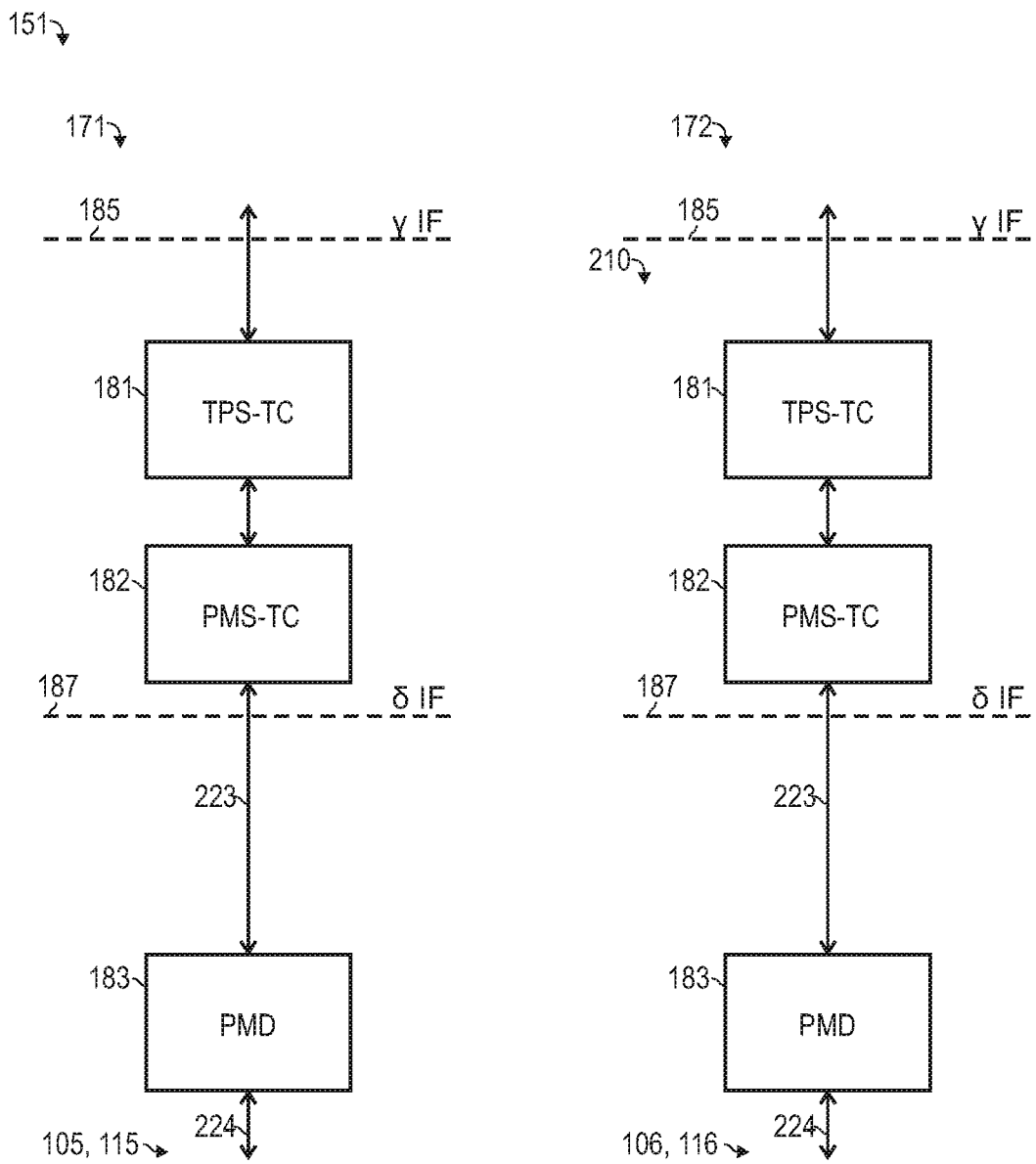

FIG. 3 illustrates aspects of a first mode 151 where bonding between a first protocol stack 171 and a second protocol stack 172 is not executed. FIG. 3 is an example where the first and second protocol stacks 171, 172 operate according to the G.fast protocol.

In some examples, data may be communicated on the first physical line 121 by means of the first protocol stack 171 independently of data communicated on the second physical line 122 by means of the second protocol stack 172. In particular, in such a scenario it is possible that the second protocol stack 172 is operated at Showtime in a first mode 151, i.e., fully powered-up and communicating data on the physical line 122. Such techniques may increase a traffic throughput.

In other examples, it is also possible that the second protocol stack 172 is operated in a Showtime low power state or in a powered down state. I.e., the Showtime low power state may correspond to a scenario where initialization of the second protocol stack 172 from the powered down state has occurred, but—beyond some management data or control data—payload data is not communicated via the second physical line 122. E.g., the second protocol stack 172 may generate idle bits and/or synchronization symbols for communication on the second physical line 122 in the first mode 151. Such techniques may reduce power consumption.

Figure 4:
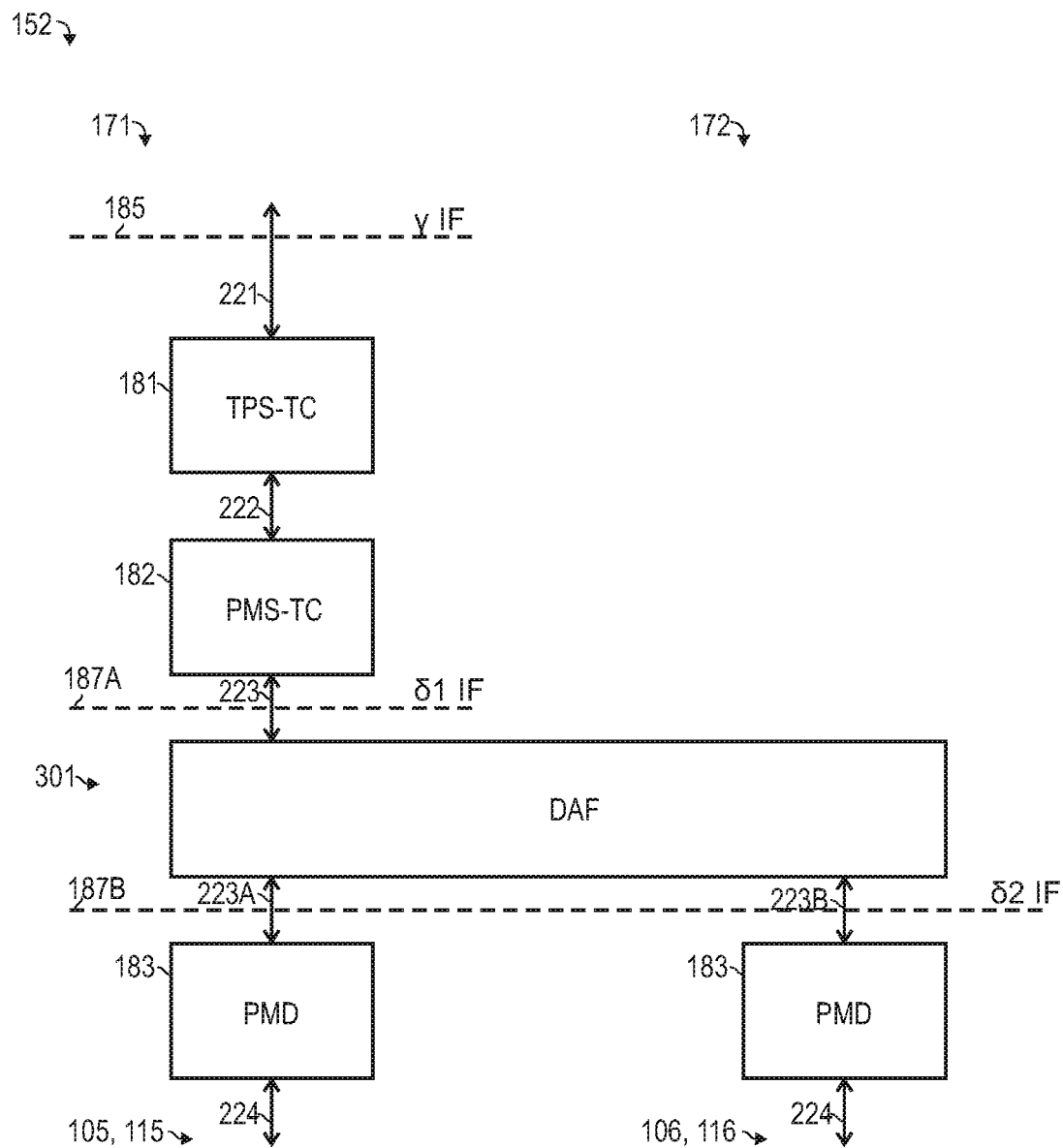

As illustrated with respect to FIG. 4, it is now possible to switch or transition from the first mode 151—where bonding 301 is not executed—to a second mode 152 where bonding 301 is executed. Switching may occur during training and/or during Showtime.

As can be seen from FIG. 2, the bonding 301 is at the upper edge 187A, 187B of the PMD layer 183. Bonding 301 can be implemented using time-synchronous operation— i.e., boundaries of symbols communicated via the first and second physical lines 121, 122 being in time domain—such that whenever a message is communicated over the upper edge of the PMD layer 183 of the first protocol stack 171 (labeled in FIG. 4 as $\delta 2$ interface 187B) a corresponding message 223B is communicated over the upper edge/$\delta 2$ interface 187B of the PMD layer 183 of the second protocol stack 172. To achieve this, the bonding 301—implemented at the upper edge of the PMD layer 183—comprises distributing messages 223 received from the layer 182 between the first protocol stack 171 and the second protocol stack 172. In FIG. 4, said distributing is implemented by a functional/logical entity labelled $\delta$ aggregation function (DAF). FIG. 4 illustrates that the original $\delta$ interface 187 has been split into the $\delta 1$ interface 187A and the $\delta 2$ interface 187B due to the insertion of the DAF.

Implementing techniques of bonding 301 at the PMD layer 183, e.g., as illustrated with respect to FIG. 4 has certain effects. First, by implementing said bonding 301 at the low PMD layer 183, it is possible to enable/disable said bonding 301 on-the-fly during Showtime. E.g., in some examples it is then possible to switch between the first mode 151 and the second mode 152 depending on a traffic load and a traffic throughput of communication on the first physical line 121 via the PMD layer 183 of the first protocol stack 171. E.g., if the traffic load exceeds a certain predefined threshold, the second mode 152 may be selectively enabled. The predefined threshold may be dependent on the traffic throughput of the PMD layer 183 of the first protocol stack 171.

Further, additional memory—as may be required in reference implementation where bonding is executed at an upper layer 181, 182, 190—may not be required or only be required to a limited degree.

Further, by implementing the bonding 301 according to techniques disclosed herein, traffic throughput/bit rate capabilities can be increased. E.g., it can be possible to implement a traffic throughput of 1 Gbit per second over comparably long physical lines 121, 122 when implementing a G.fast protocol. E.g., such traffic throughput may be achieved for a length of the physical lines 121, 122 of up to 250 meters. In particular, by said bonding 301, it can be possible to double the available traffic throughput over a given length of the physical lines 121, 122.

If compared to reference implementation, a complexity can be reduced, e.g., due to a reduced size of required memory buffers.

Further, in a scenario where quad-structure cables com are relied upon, a particular improvement of efficiency can be achieved by bonding 301 the two wire pairs implementing the physical lines 121, 122 due to coordinated communication via both wire pairs.

Now referring again to FIGS. 3 and 4, details of operation will be explained. As mentioned above, there are two physical lines 121, 122 associated with a transmitter and receiver 101, 111. Both the transmitter 101 and the receiver 111 implement PMD layers 183, each PMD layer 183 associated with the two protocol stacks 171, 172. The TPS-TC, PMS-TC layers 181, 182 of the first protocol stack 171 are permanently—i.e., independently of the first or second mode of operation 151, 152—connected with the PMD layer 183 of the first protocol stack 171. The TPS-TC layer 181 is connected to a user traffic/payload data at the γ interface 185. The payload data may originate from higher layers above the physical layer 180. Because of this, the first protocol stack 171 is operating as so-called master or bonding master. Differently, the second protocol stack 172 operates as slave or bonding slave. In particular, the master protocol stack 171 controls operation of the PMD layers 183 of, both, the first and second protocol stacks 171, 172. In particular, the messages 223 crossing the lower edge of the layer 182/the δ1 interface 187A are distributed between the PMD layers 183 of the first and second protocol stacks 171, 172. In particular, the second protocol stack 172 only implements the PMD layer 183 in the second mode 152; the TPS-TC, PMS-TC layers 181, 182 are not required and used (and, therefore, not shown in FIG. 4).

FIG. 3 illustrates a situation during unbonded first mode 151. Here, the first protocol stack 171 communicates payload data. This comprises transmitting payload data across the γ interface 185 to PMD 183 of the first protocol stack 171 and receiving payload data from the physical line 121, processing it at the PMD layer 183 as well as at the TPS-TC, PMS-TC layers 181, 182 and passing the payload data across the γ interface towards the data link layer 190 in reverse direction. In the unbonded first mode 151, it is not required that the second protocol stack 172—acting as slave—transmits or receives any payload data; therefore, the second protocol stack 172 doesn't have to be powered in full. The second protocol stack 172 may even be powered down.

Using the unbonded first mode is possible as long as the traffic throughput of the first protocol stack 171 is sufficient for the application speed/the traffic load. Where the traffic throughput becomes insufficient, a part of the traffic is distributed to the second protocol stack 172, in the second mode 152 (cf. FIG. 4). For that, the second protocol stack has to achieve full operation bit rate within a reasonable timeframe of, e.g., 1-2 seconds. E.g., for this, it can become possible to transition the second protocol stack 172 from a powered down state or a Showtime low power state to Showtime. Then, the bonding 301 can be executed in response to initializing the second protocol stack 172 into Showtime, e.g., from powered down mode or Showtime low power mode.

Figure 5:
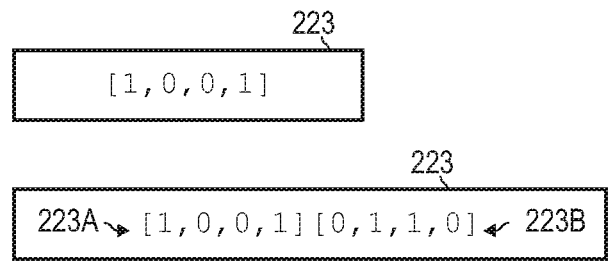
FIG. 5 schematically illustrates messages communicated between the Physical Medium Dependent layer and an upper layer of the protocol stack which is above the Physical Medium Dependent layer according to various embodiments.

Now referring to FIG. 5, aspects regarding the data exchange across the δ interface 187, 187A, 187B are illustrated. In particular, FIG. 5 illustrates distributing messages 223 between the first and second protocol stacks 171, 172.

Typically, the data exchange at the δ interface 187, 187A, 187B is done via so-called "data frames" according to reference implementation. FIG. 5 illustrates a data frame message 223 being an ordered set of bits or bytes that can be modulated to, e.g., exactly a single DMT symbol for communication on a physical line 121, 122. A data frame message 223 can be seen as a row vector with one entry for each bit. Thus, according to reference implementations, for every transmit DMT symbol—except synchronization symbols—the respective PMD layer 183 requests a data frame message 223 which is delivered by the PMS-TC layer 182; likewise, for every receive DMT symbol—except synchronization symbols—the PMD layer 183 delivers a data frame message 223 to the PMS-TC layer 182.

During operation, the data frame messages 223 of the first protocol stack 171 carry payload data and/or management data, whereas the data frame messages 223 of the second protocol stack 172, in the unbonded first mode 151, do not carry payload data or management data, but are filled up with idle bits or dummy bits.

Illustrated in FIG. 5, upper part is a situation where the data frame message 223 comprises four bits. When operating in the unbonded first mode 151, the data frame message 223 communicated across the lower edge of the PMS-TC layer 182/the δ1 interface 187A is the same as the data frame message 223 communicated across the upper edge of the PMD layer 183/the δ2 interface 187B. Thus, in the unbonded first mode 151, the transmit data frame message 223 generated by the PMS-TC layer 182 of the first protocol stack 171 is identical to the transmit data frame message passed to the PMD layer 183 of the first protocol stack 171.

Next, the situation of the bonded second mode 152. In the bonded second mode 152 the second protocol stack 172 is powered and the DAF bonds the PMD layer 183 of the first protocol stack 171 and the PMD layer 183 of the second protocol stack 172, e.g., as slave to the master first protocol stack 171. The transmit data frame messages 223 of the PMS-TC layer 182 of the first protocol stack 171 are distributed between the first protocol stack 171 and the second protocol stack 172, in particular between the PMD layer 183 of the first protocol stack 171 and the PMD layer of the second protocol stack 172. Likewise, data frame messages 223 comprising data received via one of the physical lines 121, 122 are bonded, e.g., by the DAF, and passed to the layer 182 of the first protocol stack 171.

In the bonded second mode 152, in some examples, any transmit data frame message 223 generated by the PMS-TC layer 182 of the first protocol stack 171 is distributed either to the PMD layer 183 of the first protocol stack 171 or to the PMD layer 183 of the second protocol stack 172.

In particular in such an example, it is possible to flexibly adapt the amount of data distributed to the first protocol stack 171 in comparison to the amount of data distributed to the second protocol stack 172 (bonding strength). This may be implemented by distributing every second, third, fourth, etc. transmit data frame message 223 to the second protocol stack 172 for transmission on the second physical line 122. E.g., the bonding strength may be adjusted depending on at least one of the traffic load and the traffic throughput of the communication on the physical line 121. To facilitate time-synchronized transmission the PMD layer 183 of the second protocol stack 172 may fill up transmission frames with idle bits where required.

In FIG. 5, lower part, a further example is shown. Here, a data frame message 223 generated by the PMS-TC layer 182 of the first protocol stack 171 is a concatenation of a first fraction 223A corresponding to the data frame message to be passed to the PMD layer 183 of the first protocol stack 171—and a second fraction 223B corresponding to the data frame message to be passed to the PMD layer 183 of the second protocol stack 172. This corresponds to a vectored concatenation of to row vectors as illustrated in the lower part of FIG. 5. In such a scenario, the distributing comprises splitting at least some of the messages 223 to distribute the fractions 223A, 223B of the messages 223 between the first protocol stack 171 and the second protocol stack 172. In particular, in such a scenario the distributing may depend on a position of the fractions 223A, 223B of the messages 223 within each message 223. E.g., in the example illustrated in the lower part of FIG. 5, the fraction 223A associated with the PMD layer 183 of the first protocol stack 171 is located in the beginning of the message 223, i.e., at the most significant bit, while the fraction 223B associated with the PMD layer 183 of the second protocol stack 172 is located at the end of the data frame message 223, i.e., at the least significant bit. In other examples, the reverse order is conceivable where the fraction 223A associated with the PMD layer 183 of the first protocol stack 171 is located at the least significant bit.

With respect to FIG. 5 above, a specific rule for distributing the data frame messages 223 between the first and second protocol stacks 171, 172 has been illustrated. In the various scenarios disclosed herein, it is possible to implement various kinds and types of rules of said distributing. E.g., such rules of distributing the data frame messages 223 can be predefined or can be negotiated/aligned between the transceivers 101, 111 during startup or during Showtime when switching between the first mode 151 and the second mode 152. E.g., respective control data indicating such a predefined rule may be communicated on at least one of the first physical line 121 and the second physical line 122, e.g., in response to switching between the first mode 151 and the second mode 152.

Hereinafter, some examples are given of specific rules of distributing the data frame messages 223 between the first and second protocol stacks 171, 172.

In a first example, all data frame messages 223 are distributed between the first and second protocol stacks 171, 172, e.g., in alternating order or using a different pattern having a weaker bonding strength.

In a second example, all data frames having indices larger than zero (the indices corresponding to a position of a transmission frame) are distributed between the first and second protocol stacks 171, 172, e.g., in alternating order or using a different pattern. Here, data frames having index zero in the transmission frame may all be assigned to either the first protocol stack 171 or the second protocol stack 172. Data frame messages 223 having index zero in the transmission frame are typically positioned at the beginning of the transmission frame. Typically, data frame messages 223 having index zero carry a dedicated management section including management information for the first protocol stack 171 and/or the second protocol stack 172.

Figure 9:
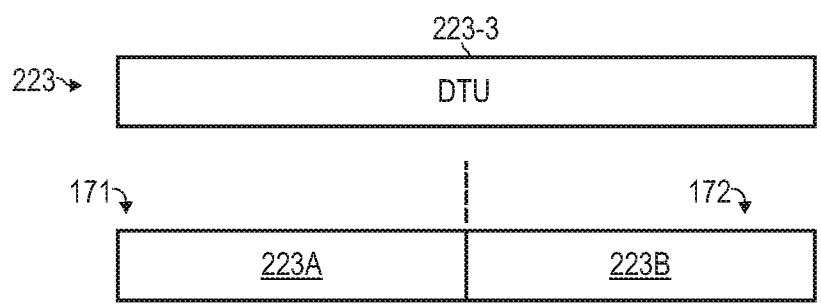
FIG. 9 generally corresponds to FIG. 6 and illustrates further embodiments.

Concerning the distributing between the first and second protocol stacks 171, 172, in case of G.fast it is typically distinguished between the synchronization symbols which are transporting no data frame messages 223, data symbols which are transporting data frame message 223 with index larger than zero and RMC symbols which are transporting data frame messages 223 with index zero. The various indices of the data frame messages are also illustrated by FIG. 9-3 of G.9701 (Dec. 5, 2014).

With regard to the G.fast protocol, examples of management information comprise the Robust Management Channel (RMC) and the embedded operations channel (eoc) which is typically carried in a combined management and payload section. In particular, management information such as the RMC or the eoc may be determined by one of the upper layers 181, 182. Management information for the first protocol stack 171 or the second protocol stack 172 may comprise elements selected from the group comprising: TDD framing parameters; Showtime Adaptive Rate (SAR) parameters; and vectoring error reports.

Figure 6:
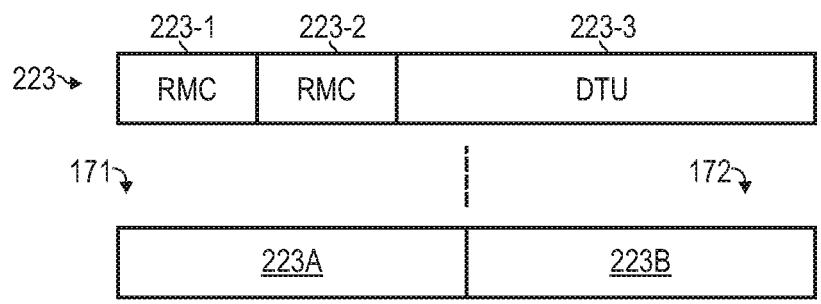
FIG. 6 schematically illustrates the messages of FIG. 5 at greater detail, wherein the messages comprise a management section and a combined payload and management section and wherein FIG. 6 further illustrates splitting the messages to distribute fractions of the messages between the first and second protocol stacks according to various embodiments.

Now turning to FIG. 6, various aspects with respect to distributing of the data frame messages 223 received from the layer 182 between the PMD layer 183 of the first protocol stack 171 and the PMD layer 183 of the second protocol stack 172 are illustrated. In the scenario FIG. 6, a data frame message 223 is received which comprises a first management section 223-1 comprising management information for the first protocol stack 171 and comprising a second management section 223-2 comprising management information for the second protocol stack 172. E.g., the data frame message 223 of FIG. 6 could have index zero, i.e., dedicated for the beginning of a transmission frame. The data frame message 223 further comprises a combined payload and management section which carries payload data and management information for the first protocol stack 171 and/or the second protocol stack 172. E.g., in the G.fast framework, the sections 223-1, 223-2 may correspond to the RMC while the section 223-3 corresponds to the data transfer unit (DTU) used to transfer payload data bits and further comprising eoc management information (not illustrated in FIG. 6).

The data frame message 223 is received from the PMS-TC layer 182 of the first protocol stack 171. I.e., that the management information for the second protocol stack 172 is also generated and transported by the layers 181, 182 of the first protocol stack 171 in the bonded second mode 152. In particular, in the G.fast framework, the eoc management information indicates management information for, both, the first protocol stack 171 and the second protocol stack 172. Also, the TMS-TC, PMS-TC layers 181, 182 of the first protocol stack 171, in the G.fast framework, generate the RMC management sections indicating, both, management information for the first protocol stack 171 and the second protocol stack 172, respectively.

In the example of FIG. 6, the RMC management sections 223-1, 223-2 are, both, distributed to the first protocol stack 171 only, i.e., are not distributed to the second protocol stack 172. Here, the fraction 223A which comprises the management sections 223-1, 223-2 are distributed to the first protocol stack 171.

Figure 7:
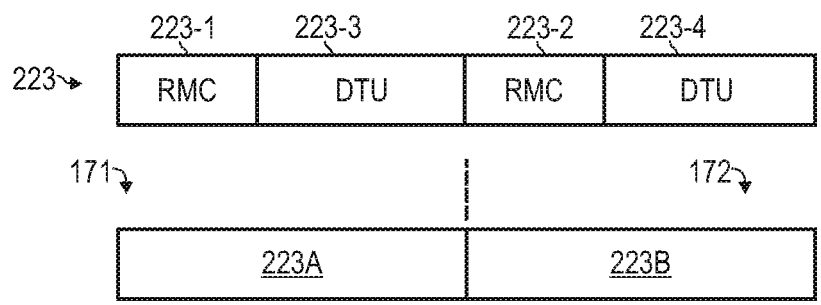
FIG. 7 generally corresponds to FIG. 6 and illustrates further embodiments.

FIG. 7 illustrates a further scenario, where the RMC management sections 223-1, 223-2 are distributed to, both, the first protocol stack 171 and the second protocol stack 172. Here, the management section 223-1 (the management section 223-2) indicating management information for the first protocol stack 171 (the second protocol stack 172) is communication on the first physical line 121 (the second physical line 122).

Figure 8:
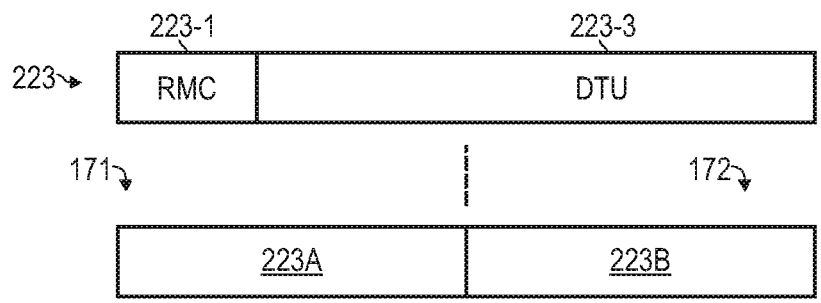
FIG. 8 generally corresponds to FIG. 6 and illustrates further embodiments.

FIG. 8 illustrates a further scenario of distributing the data frame messages 223 between the first and second protocol stacks 171, 172. In the scenario of FIG. 8, only a single RMC management section 223-1 is included in the data frame message 223; e.g., the single RMC management section 223-1 may indicate management information for only one of the first or second protocol stacks 171, 172 or may indicate management information for, both, the first and second protocol stacks 171, 172.

The scenario of FIG. 9 illustrates a further scenario where a data frame message 223 has an index larger than zero, i.e., being positioned not in front of a transmission frame of the PMD layer 183; such a data frame message 223 does not comprise any RMC management section 223-1, 223-2; but may include eoc management information.

In the various scenarios disclosed above, it may be helpful to distinguish between the management sections 223-1, 223-2 indicating management information for the first protocol stack 171 on the one hand side, and the management sections 223-1, 223-2 indicating management information for the second protocol stack 172 on the other hand side. For this purpose, it is possible that management information—such as RMC information or eoc information—includes special identification bits to enable differentiation between management information for the first and second protocol stacks 171, 172, respectively. Such control indices implemented by the identification bits may facilitate distinguishing the control sections 223-1, 223-2 at the upper PMS-TC, TMS-TC layers 181, 182. The control indices may also facilitate distributing between the first and second protocol stacks 171, 172.

In a further example, the management sections 223-1, 223-2 are distinguished by the time position, respectively the position within each data frame message 223. Such a scenario is conceivable in a scenario where transmission frames are associated with dedicated data frame messages 223 or respective sections 223-1, 223-2 of data frame messages 223 as is the case for RMC management information. Such a scenario is in particular facilitated by time-synchronized physical lines 121, 122 of a bonding group. Distinguishing between management information for the first and second protocol stacks 171, 172 based on the time position of the received transmission frames may thus be only possible for a limited degree in the G.fast framework for eoc management information which is communicated together with the payload data and has its insertion/extraction allocation at the layer 181—unless a special mapping of eoc management information aligned with DTU 223-3 boundaries and boundaries of the data frame messages 223 is used.

In still a further embodiment, tone indices of bits of the data frame messages 223 are used to distinguish between management information for the first and second protocol stacks 171, 172, respectively. E.g., a concept of so-called virtual tone indices may be employed where the value of the tone indices enables to distinguish between tones used for communicating on the first physical line 121 via the first protocol stack 171 and tones used for communicating on the second physical line 122 via the second protocol stack 172. Also, the tone indices may facilitate the distributing between the first and second physical lines 172, 172.

Figure 10:
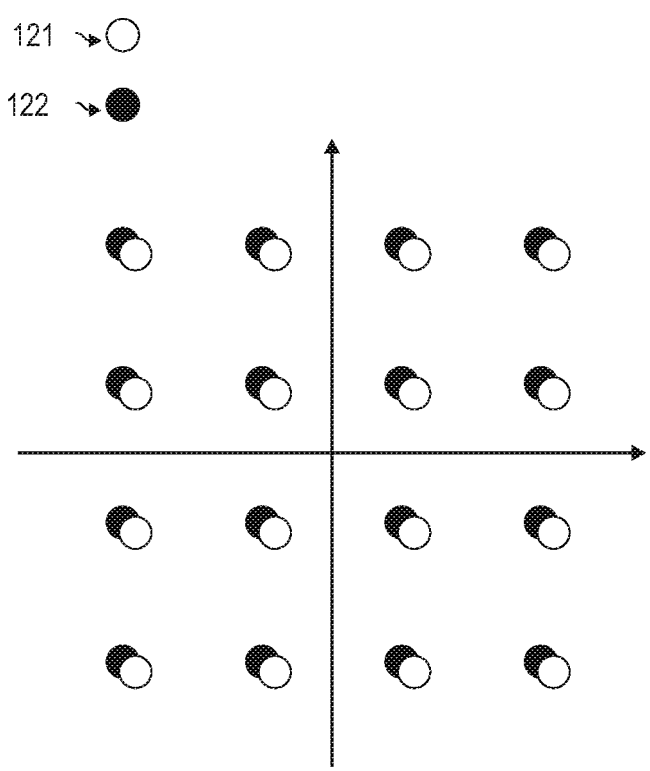
FIG. 10 illustrates tone indices of bits of the messages, the tone indices associating the bits with tones of multitone symbols transmitted on either the first physical line or the second physical line according to various embodiments.

Such a scenario of tone indices is illustrated in FIG. 10 where the various tones of the multi-tone signals used for communicating on the physical lines 121, 122 are illustrated in a constellation diagram. Respective indices may be used to judge which protocol stack 171, 172 the respective section 223A, 223B of a data frame message 223 should be distributed to. E.g., the virtual tone indices of the second protocol stack 172—operating as bonding slave—can correspond to the tone indices of the first protocol stack 171—acting as bonding master—increased by the highest tone index of the first protocol stack 171.

Figure 11:
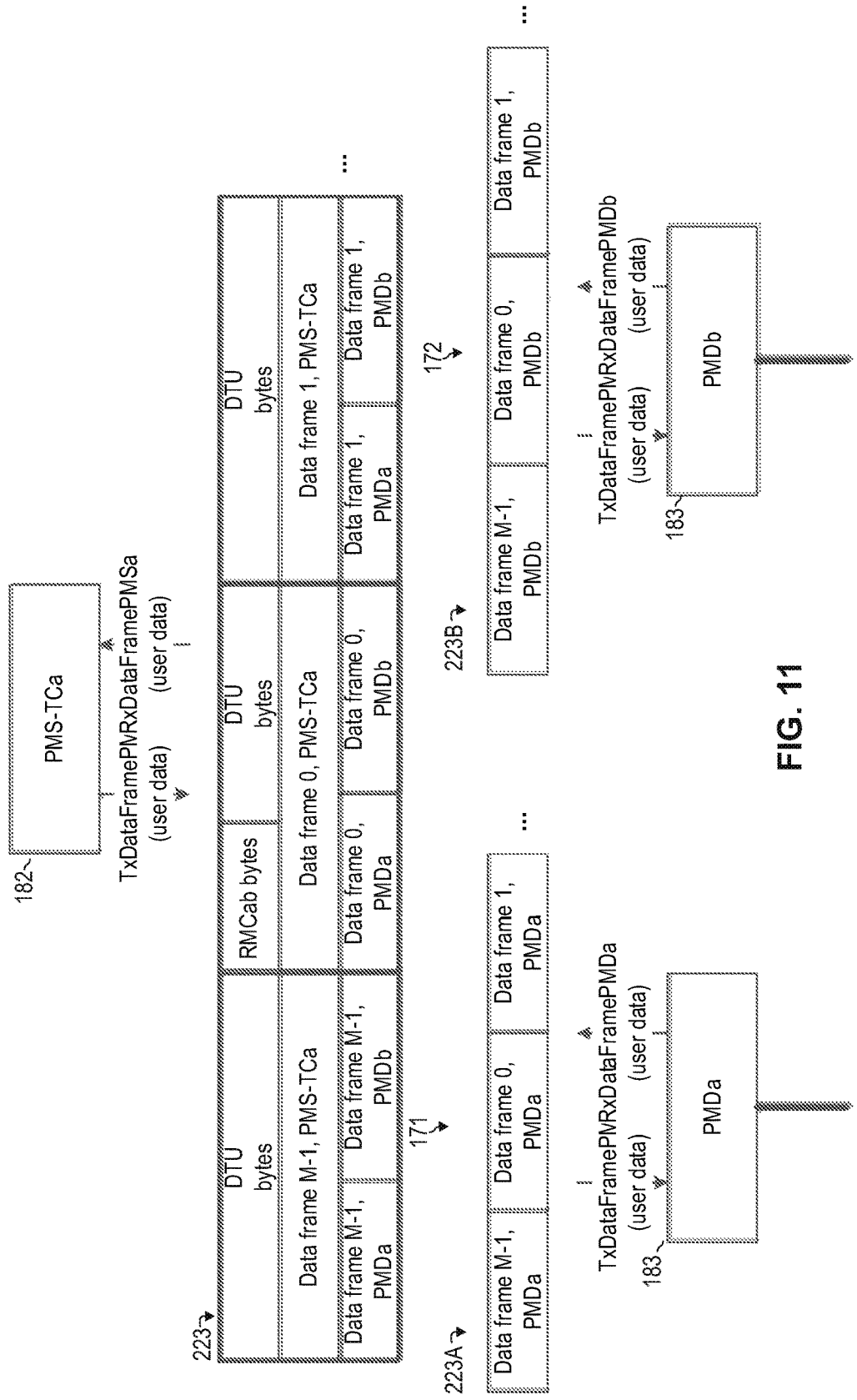
FIG. 11 schematically illustrates distributing of messages received from the upper layer of the first protocol stack above the Physical Medium Dependent layer at greater detail according to various embodiments.
Figure 12:
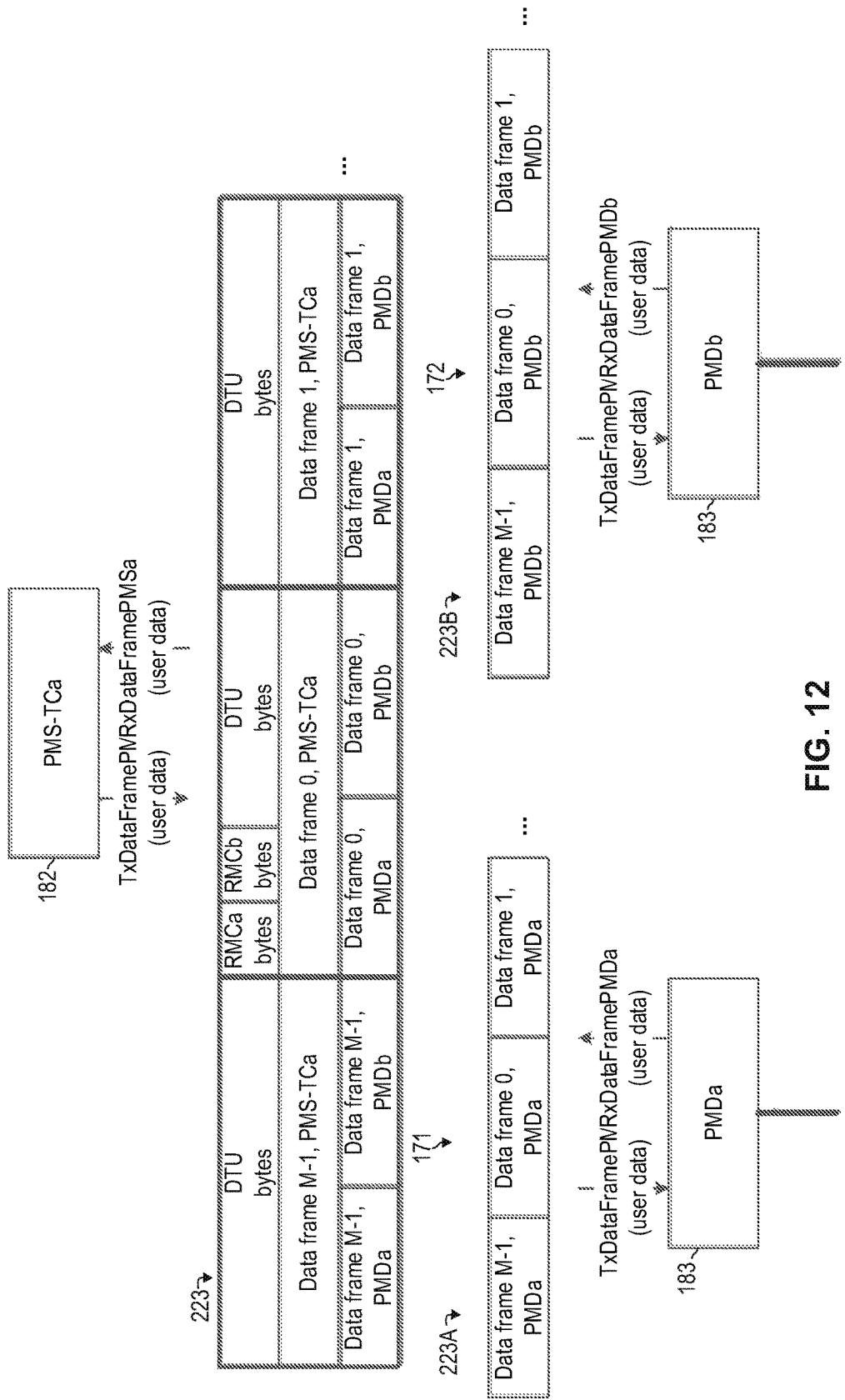
FIG. 12 generally corresponds to FIG. 11 and illustrates further embodiments.
Figure 13:
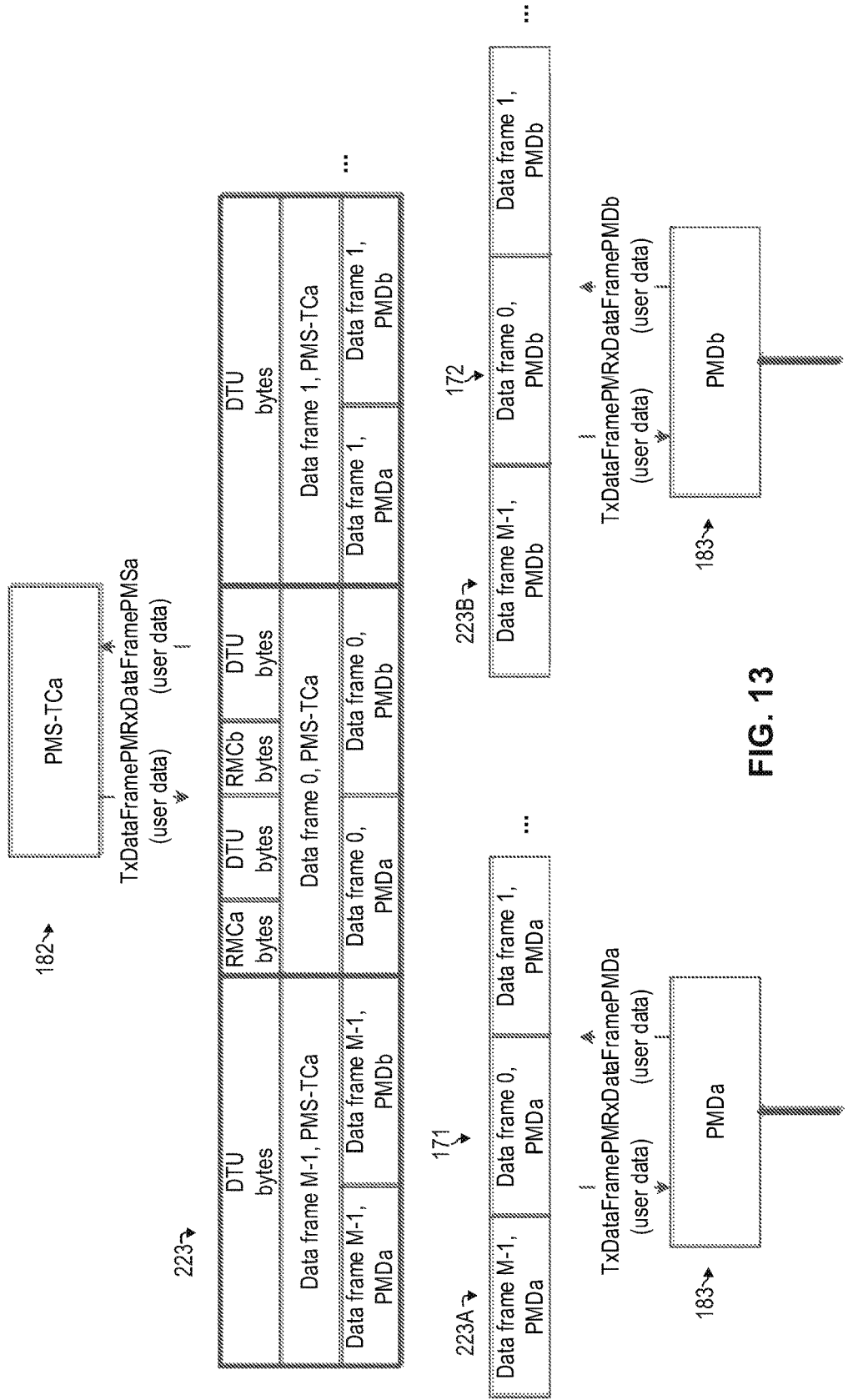
FIG. 13 generally corresponds to FIG. 11 and illustrates further embodiments.

FIGS. 11-13 illustrate the distributing of data frame messages 223 between the first and second protocol stacks 171, 171 at greater detail. Here, the PMD layer 183 of the first protocol stack 171 is labelled "PMDa" and the PMD layer 183 of the second protocol stack 172 is labelled "PMDb". FIG. 11 shows a scenario where data frame messages having index zero and data frame messages 223 having indices larger than zero are distributed. The data frame messages 223 having indices larger than zero contain payload data bits only, whereas the data frame messages 223 having index zero contain, both, payload data bits and RMC management bits.

Two examples are conceivable regarding distributing of the management section 223-1, 223-2 having RMC management information. First—as illustrated in FIG. 11—the management sections 223-1, 223-2 indicative of RMC management information for, both, the first and second protocol stacks 171, 172 are transported via the PMD layer 183 of the first protocol stack 171, only. Such a scenario may be difficult to implement where management sections 223-1, 223-2 are present in each data frame message 223, e.g., due to synchronization purposes, facilitating low-power mode, etc.

A second example as to implement two logical management channels, i.e., to distribute the management sections 223-1, 223-2 between, both, the first and second protocol stacks 171, 172 (as illustrated in FIGS. 12 and 13). Here, the first physical line 121 is used for communicating management sections 223-1, 223-2 indicating management information for the first protocol stack 171; while the second physical line 122 is used for communicating management sections 223-1, 223-2 indicating management information for the second protocol stack 172.

Figure 14:
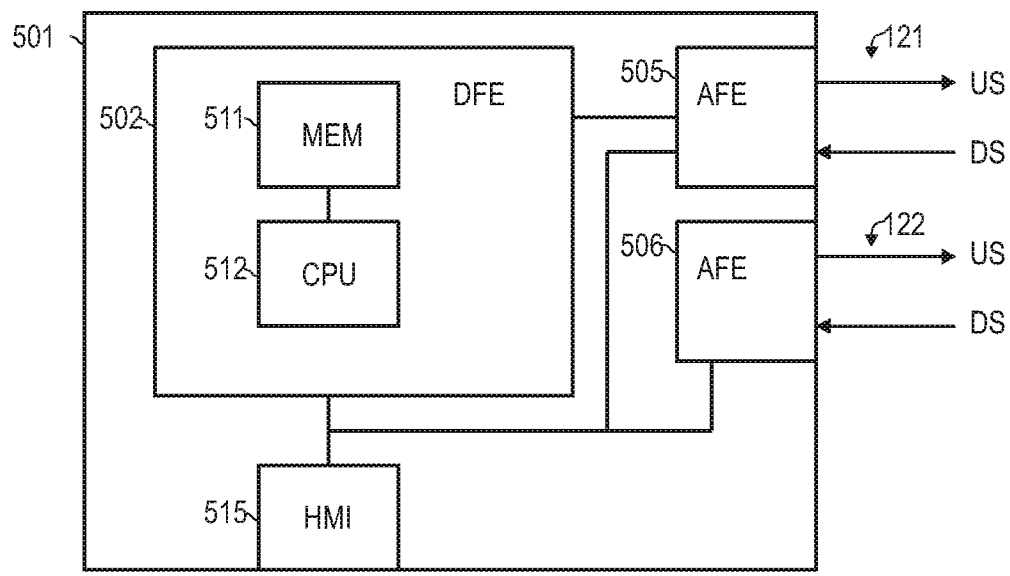
FIG. 14 schematically illustrates a device according to various embodiments.

Now turning to FIG. 14, a device 501 is illustrated which may implement techniques of bonding at the PMD layer 183 as disclosed herein. E.g., the device 501 may implement the transmitter 101 and/or the receiver 111. The device 501 comprises two AFEs 505, 506 for communicating on the physical lines 121, 122, respectively. US and DS communication is possible, e.g., in a TDD mode. The AFEs 505, 506 together with a digital front end (DFE) 502 implement the two interfaces 105, 115, 106, 116 of the transmitter 101 and/or the receiver 111, respectively. The DFE 502 comprises a processor 512 and a memory 511. The memory 511 can store program code that can be executed by the processor 512. Executing the program code causes the processor 512 to perform techniques as disclosed herein with respect to, e.g., bonding at the PMD layer 183, in particular at the δ interface 187, distributing data frame messages 283 to the first protocol stack 171 and/or the second protocol stack 172, splitting data frame messages 283, implementing the first protocol stack 171, implementing the second protocol stack 172, etc. The device 501 further comprises a human machine interface (HMI) 515 configured to output information to a user and configured to receive information from a user. The HMI 515 is optional.

Figure 15:
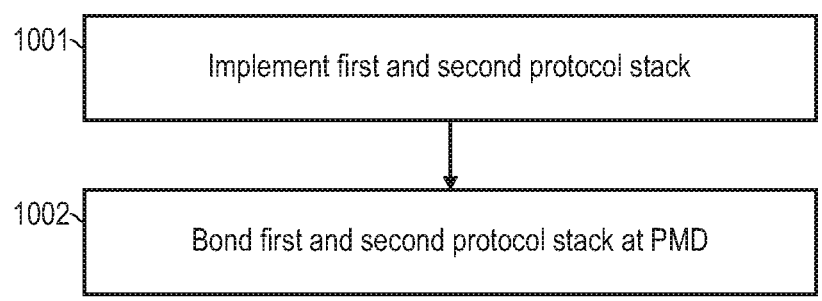
FIG. 15 is a flowchart of a method of bonding physical lines at a modem according to various embodiments.

FIG. 15 is a flowchart illustrating a method that may be executed by the processor 512. First, at 1001, the first and second protocol stacks 171, 172 are implemented. Here, in particular, it is possible that all layers 180, 190 and layers 181-183 are implemented for the first protocol stack 171, but that only the PMD layer 183 is implemented for the second protocol stack 172 (cf. FIG. 4).

Next, at 1002, the first and second protocol stacks 171, 172 are bonded 301 at the PMD layer 183. In particular, bonding may occur at the upper edge of the PMD layer 181, i.e., at the ∂ interface 187, 187A, 187B.

Figure 16:
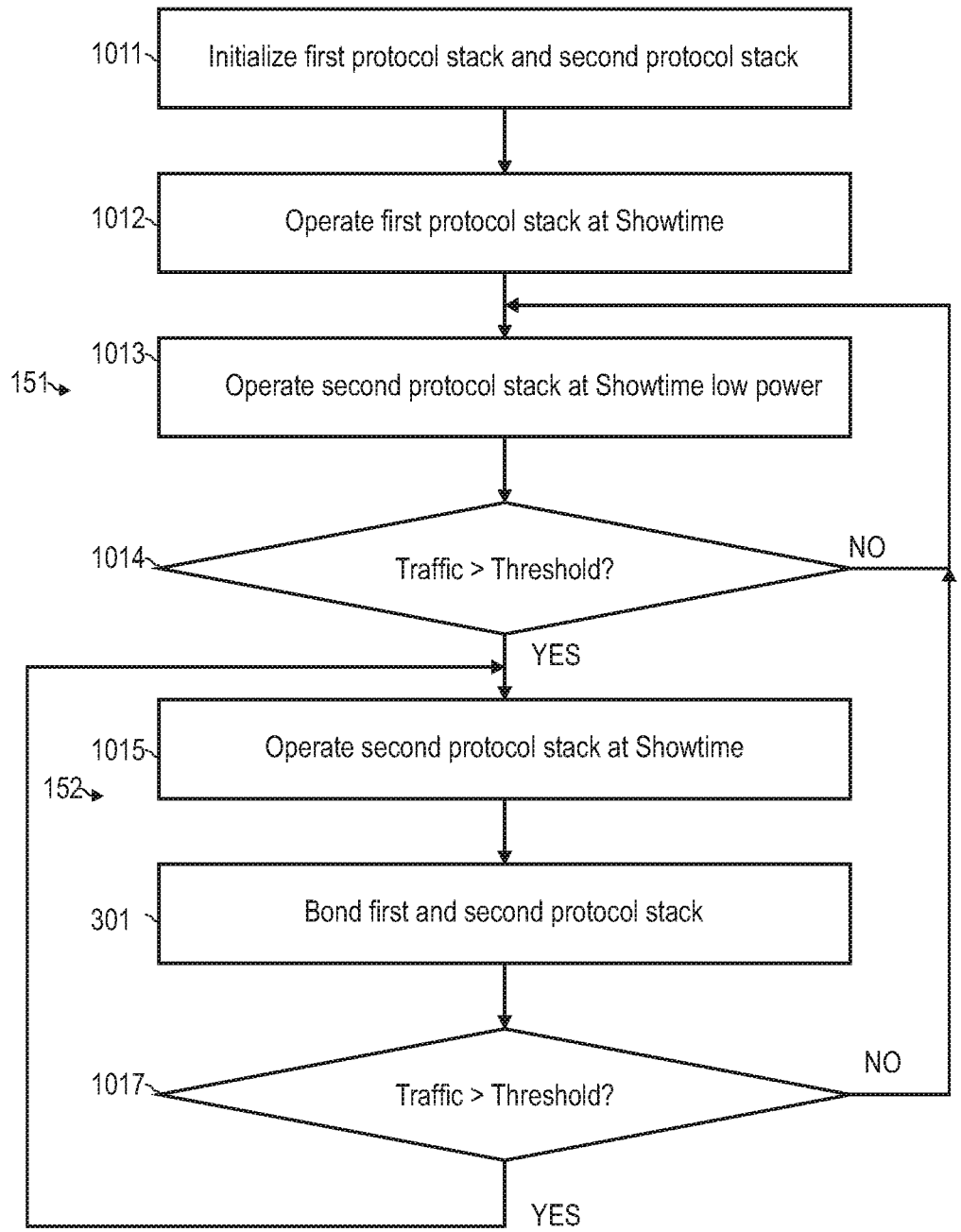
FIG. 16 is a flowchart of a method according to various embodiments.

FIG. 16 is a flowchart of a method according to various embodiments. First, at 1011, the first protocol stack 171 and the second protocol stack 172 are initialized. During the start-up procedure, information may be exchanged between the transmitter 101 and the receiver 111. Respective control data may be communicated on at least one of the first physical line 121 and the second physical line 122 and may indicate a parameter of said bonding 301.

E.g., the control data may indicate, in a first example, whether a physical line 121, 122 shall be a bonding master candidate or a bonding slave candidate during Showtime operation. In a second example, alternatively or additionally, the control data may indicate the distribution bit order, i.e., whether the received data frame messages 223 comprise fractions to be distributed to the first protocol stack 171 at the most significant bit or at the least significant bit (as illustrated above with respect to FIG. 5). In a third example, alternatively or additionally, the control data may indicate the size—e.g., in bits—and distribution order of data frame messages 223 into the first and second protocol stacks 171, 172.

During start-up/training at 1011, it is possible to synchronize the communication on the first physical line 121 and the communication on the second physical line 122 in time domain. In particular, generation of transmission frames by the physical media dependent layers 183 of the first and second protocol stacks 171, 172 may be synchronized in time domain.

FIG. 16 illustrates a scenario where initially only the first protocol stack 171 is operated at Showtime, 1012. Differently, the second protocol stack 172 goes to a Showtime low power state after initialization from powered down state, 1013. I.e., initially, payload data is communicated on the first physical line 121 via the PMD layer 171 of the first protocol stack 171, only. The second protocol stack 172 is initialized into Showtime only later.

Next, at 1014, it is checked whether the traffic—which is currently routed via the first protocol stack 171 only— exceeds a certain threshold. Only if this is the case, switching from the first mode 151 to the second mode 152 employing bonding 301 is executed. Thus, as can be seen from FIG. 16, the power state of the second protocol stack 171—which is now operated at Showtime, 1015, to facilitate the bonding 301—is controlled depending on the traffic throughput demand and the bonding.

At 1017 it is checked whether the traffic throughput is still above the threshold. If this is not the case, it is switched back from the second mode 152 to the first mode 151 and bonding 301 is stopped.

As can be seen from the exemplary scenario of FIG. 16, it is possible to switch from unbonded first mode 151 to bonded second mode 152 (bonding entry); it is also possible to switch back from bonded second mode 152 to unbonded first mode 151 (bonding exit). In particular, it is possible to switch back and forth from the first and second modes 151, 152 during Showtime.

Switching between the modes 151, 152 can be controlled by upper layers 190, 181, 182 above the PMD layer 183. In particular, the switching can depend on the traffic throughput of the applications delivering payload data. In particular, switching back and forth between the first and second modes 151, 152 can be implemented analogous to switching between low-power mode and full-power mode according to the ITU-T G.9701. Whenever an application requires a higher traffic throughput than offered by the PMD layer 183 of the bonding master first protocol stack 171, the first protocol stack 171 indicates to the higher layers 190, 181, 182 that bonding 301 is required. Then, the higher layers 190, 181, 182 initiate a bonding entry procedure. Whenever the applications do not require high traffic throughput anymore that is higher than traffic throughput offered on the first physical line 121, only, the higher layers 190, 181, 182 initiate the bonding exit procedure and switch back to the first mode 151. A certain hysteresis of switching between the first and second modes 151, 152 can be considered in time domain to avoid permanent toggling between the first and second modes 121, 122 for traffic throughput varying close to the respective threshold.

Various scenarios are conceivable for aligning the switching between the first mode 151 in the second mode 152 in time domain. E.g., for alignment of the switching between the transmitter 101 and the receiver 111, the point in time or time instant of each particular switching can be coordinated via control data exchanged between the transmitter 101 and the receiver 111. E.g., in the G.fast scenario, the eoc or the RMC can be employed. In particular, exchange of control data can be implemented analogous to reference implementations of online reconfiguration such as for SRA.

It is possible that switching between the first mode 151 and the second mode 152 occurs between two time-division multiplex frames of the PMD layer 183 and/or at a point in time corresponding to a synchronization frame of the PMD layer 183. The synchronization frame may correspond to at least one synchronization symbol communicated on one of the physical lines 121, 122. Hence, it is possible that the time instant from which the new bonded or unbonded mode 151, 152 starts is the beginning of a superframe, a particular logical frame, or a particular TDD frame. From the start of a new bonded mode 152, the layer 182 starts to dispatch data frame messages 223 in a manner as specified by a predefined rule of distributing. E.g., the layer 182 can dispatch data frame messages 223 in a concatenated manner—i.e., comprising two individual data frame messages as sections 223A, 223B for distributing to the PMD layer 183 of the first protocol stack 171 or the second protocol stack 172, respectively (cf. FIG. 5, lower part). Since synchronization symbols do not carry payload data or other data included in the data frame message 223 and are communicated on both physical lines 121, 122 at the same point in time, they can be used to mark a switching point. In particular, such a technique enables the receiver 111 to detect the switching and implement changes to the mode of operation of the upper layers 181, 182 and further implementing the DAF. E.g., the first protocol stack 171 can handle switching procedures between the modes 151, 152 in a manner comparable to reference implementations with respect to SRA or Fast Rate Adaptation (FRA). For sake of channel estimation, the PMD layer 183 of the second protocol stack 172 typically sends synchronization symbols in both modes 151, 152.

With respect to FIG. 16, a scenario has been illustrated where switching to the second mode 152 comprising bonding 301 is triggered by a required traffic, 1014, 1017. In other examples, it is also possible to initialize the second protocol stack 172 from a powered down state into Showtime and execute bonding 301 in response to initializing the second protocol stack 172 into Showtime. I.e., in such a scenario it is possible that the second mode 152 is activated automatically once the second protocol stack 172 has initialized into Showtime—irrespective of the traffic throughput. Here, the second protocol stack 172 implementing the bonding slave is bonded to the first protocol stack 171 implementing the bonding master immediately and autonomously after going to Showtime, e.g., at the first data frame message 223 of the first superframe.

In the various scenarios disclosed herein, examples have been given where the first protocol stack 171 acts as a master with respect to the second protocol stack 172 implementing a slave. Various scenarios are conceivable for deciding which protocol stack 171, 172 acts as master and slave, respectively. In one example, the protocol stack 171, 172 acting as bonding master is defined by the PMD layer 183 which is going first to Showtime after power up. Hence, it is possible that the first protocol stack 171 acting as master is initialized first into Showtime and that only then the second protocol stack 172 is initialized into Showtime.

Summarizing, above various techniques for bonding in the modem have been illustrated, in particular for a modem having two pairs of wires, each pair being coupled respectively to a master and slave module, wherein at least one of the master and slave module has a TMS-TC layer 181 and the PMS-TC layer 182 coupled to a PMD layer 183 through a δ interface 187, 187A, 187B, wherein the two pairs of wires are bonded at the PMD layer 183. Here, it is possible that the master controls the two physical media dependent layers 183 of the first and second protocol stacks 171, 172, respectively. Time of bonding entry and bonding strength can be adjusted by upper layers 181, 182, 190, in particular by a traffic throughput demand of applications implemented in upper layers 181, 182, 190. The power of the protocol stack of the bonding slave can be adjusted by the time of the bonding entry and/or the bonding strength.

By the various techniques disclosed herein, effects can be achieved. In particular, dynamic switching between a bonded state and an unbonded during Showtime is possible. The switching can occur within a time duration corresponding to a single superframe. The switching can mimic online reconfiguration according to reference implementation and therefore enable simple implementation for the physical layer of transmitter and receiver.

By the techniques disclosed herein, further, a higher traffic throughput can be achieved, because bonding at the PMD layer typically does not require a significant bonding overhead to be communicated via the physical lines. In particular, it is not required—as in reference implementation—to segment data as an upper layer and include respective sequence numbers in the segmented data in order to facilitate data reassembly. Instead, the time-synchronized operation of the PMD layers of the first and second protocol stacks can be relied upon for reassembly.

A further effect is that power consumption can be significantly reduced. In particular, where operation in an unbonded first mode is sufficient in terms of required traffic throughput, protocol stacks implementing bonding slaves can be put into a low-power mode. This may be particularly relevant for IoT applications.

Further, by implementing techniques of bonding as disclosed herein, it is typically not required to implement differential link delay compensation buffers. This and other techniques disclosed herein reduce the complexity required. In particular, it is not required to implement segmentation at the data link layer or an upper edge of the physical layer—rendering it unnecessary to include respective segmentation sequence numbers. Further, it is not required to re-order segment and data chunks by means of such sequence numbers. Further, at startup it is not required to negotiate a special bonding function.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

E.g., while various examples have been disclosed with respect to the G.fast protocol, it is possible to readily apply the respective techniques to other communication systems or protocols. In particular, respective techniques as disclosed herein may be readily applied to multitone communication in time-synchronized physical lines. E.g., while various scenarios have been disclosed with respect to wired physical lines, respective techniques may be readily applied to air interfaces.

E.g., while above various examples have been discussed with respect to US, respective techniques may be readily applied to DS. Further, the techniques disclosed herein are not limited to uni-directional communication on the physical lines, but can be applied to bi-directional communication, e.g., in a TDD or FDD geometry.

Further, while above reference has been made to various specific layers of the physical layer such as the TMS-TC layer and the PMS-TC layer, in other scenarios, other kinds of layers of the physical layer may be implemented. E.g., different terminology may be adapted for the layers by standards according to the ITU-T or the OSI.

The invention claimed is:
1. A method of bonding physical lines at a modem, the method comprising:
   implementing a first protocol stack for communication on a first physical line,
   implementing at least parts of a second protocol stack for communication on a second physical line,
   bonding the first protocol stack and the second protocol stack at the Physical Medium Dependent layer of the first protocol stack and at the Physical Medium Dependent layer of the second protocol stack, wherein said bonding comprises:
      receiving messages from an upper layer of the first protocol stack above the Physical Medium Dependent layer, the messages comprising at least one of a payload section, a management section, and a combined payload and management section,
      distributing the messages between the first protocol stack and the second protocol stack,
   wherein said distributing comprises splitting at least some of the messages to distribute fractions of the messages between the first protocol stack and the second protocol stack.
2. The method of claim 1,
   wherein said bonding is at an upper edge of the Physical Medium Dependent layer of the first protocol stack and an upper edge of the Physical Medium Dependent layer of the second protocol stack.
3. The method of claim 2,
   wherein the upper edge of the Physical Medium Dependent layer is the delta interface.
4. The method of claim 1,
   wherein at least those fractions of the messages comprising the management section and/or the combined payload and management section are distributed to the first protocol stack, the management section and the combined payload and management section indicating management information for the first protocol stack and the second protocol stack.
5. The method of claim 1,
   wherein said distributing depends on a predefined rule.
6. The method of claim 1,
   wherein the first protocol stack comprises the Physical Medium Dependent layer and at least one upper layer above the Physical Medium Dependent layer,
   wherein the second protocol stack comprises the Physical Medium Dependent layer and does not comprise the at least one upper layer above the Physical Medium Dependent layer.

7. The method of claim 1,
wherein the first protocol stack is operated as master,
wherein the second protocol stack is operated as slave.

8. The method of claim 1, further comprising:
initializing the second protocol stack from a powered down state into Showtime,
wherein said bonding is executed in response to initializing the second protocol stack into Showtime.

9. The method of claim 8,
wherein the second protocol stack is initialized into a Showtime low power state.

10. The method of claim 1,
wherein in a first mode said bonding is not executed,
wherein in a second mode said bonding is executed,
wherein the method further comprises:
switching between the first mode and the second mode during Showtime.

11. The method of claim 10, further comprising:
in the first mode: the second protocol stack generating at least one of idle bits and synchronization symbols for communication on the second physical line.

12. The method of claim 10, further comprising:
in the first mode: operating the second protocol stack in a Showtime low power state or in a powered down state.

13. The method of claim 10, further comprising:
switching between the first mode and the second mode depending on at least one of a traffic load and a traffic throughput of the communication on the first physical line.

14. The method claim 10, further comprising:
switching between the first mode and the second mode at a point in time between two time-division multiplex frames of the Physical Medium Dependent layer and/or at a point in time corresponding to a synchronization frame of the Physical Medium Dependent layer, the synchronization frame corresponding to at least one synchronization symbol.

15. The method claim 10, further comprising:
in response to switching between the first mode and the second mode: communicating control data at least one of the first physical line and the second physical line, the control data indicating a parameter of said bonding.

16. The method of claim 15,
wherein said distributing depends on a predefined rule, and
wherein the control data indicates the predefined rule.

17. The method of claim 1, further comprising:
modulating a sequence of bits output by the Physical Medium Dependent layer of the first protocol stack into a multitone symbol transmitted on the first physical line,
modulating a sequence of bits output by the Physical Medium Dependent layer of the second protocol stack into a multitone symbol transmitted on the second physical line.

18. A method of bonding physical lines at a modem, the method comprising:
implementing a first protocol stack for communication on a first physical line,
implementing at least parts of a second protocol stack for communication on a second physical line,
bonding the first protocol stack and the second protocol stack at the Physical Medium Dependent layer of the first protocol stack and at the Physical Medium Dependent layer of the second protocol stack, wherein said bonding comprises:
receiving messages from an upper layer of the first protocol stack above the Physical Medium Dependent layer, the messages comprising at least one of a payload section, a management section, and a combined payload and management section,
distributing the messages between the first protocol stack and the second protocol stack,
wherein said distributing depends on at least one of control indices of sections of the messages associated with the first protocol stack or the second protocol stack, tone indices of bits of the messages, the tone indices associating the bits with tones of multitone symbols transmitted on either the first physical line or the second physical line, and a position of fractions of the messages within each message.

19. A device, comprising:
a first interface configured to communicate on a first physical line,
a second interface configured to communicate on a second physical line,
at least one processor configured to implement a first protocol stack for communication on the first physical line via the first interface,
wherein the at least one processor is further configured to implement at least parts of a second protocol stack for communication on the second physical line via the second interface,
wherein the at least one processor is configured to bond the first protocol stack and the second protocol stack at the Physical Medium Dependent layer of the first protocol stack and at the Physical Medium Dependent layer of the second protocol stack,
wherein in bonding the first and second protocol stacks, the at least one processor is configured to:
receive messages from an upper layer of the first protocol stack above the Physical Medium Dependent layer, the messages comprising at least one of a payload section, a management section, and a combined payload and management section, and
distribute the messages between the first protocol stack and the second protocol stack,
wherein in the distributing the at least one processor is configured to split at least some of the messages to distribute fractions of the messages between the first protocol stack and the second protocol stack.

* * * * *